March 13, 1951 L. C. MILLER 2,545,002
MACHINE FOR MOLDING CONCRETE BLOCKS
Filed Nov. 23, 1949 2 Sheets-Sheet 1
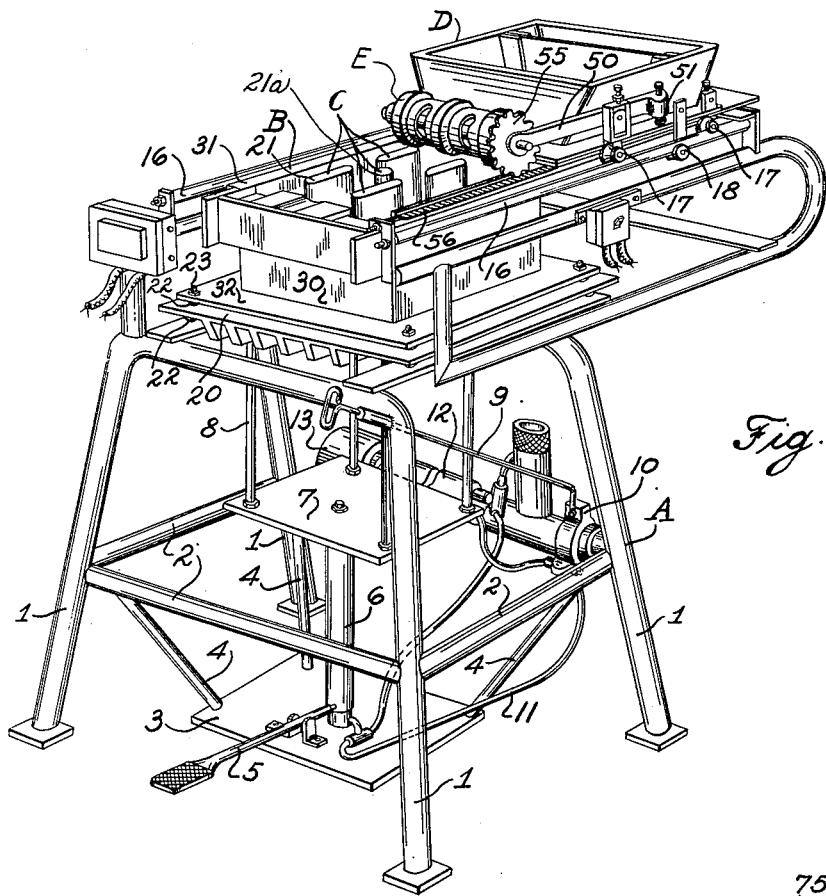
Fig. 1
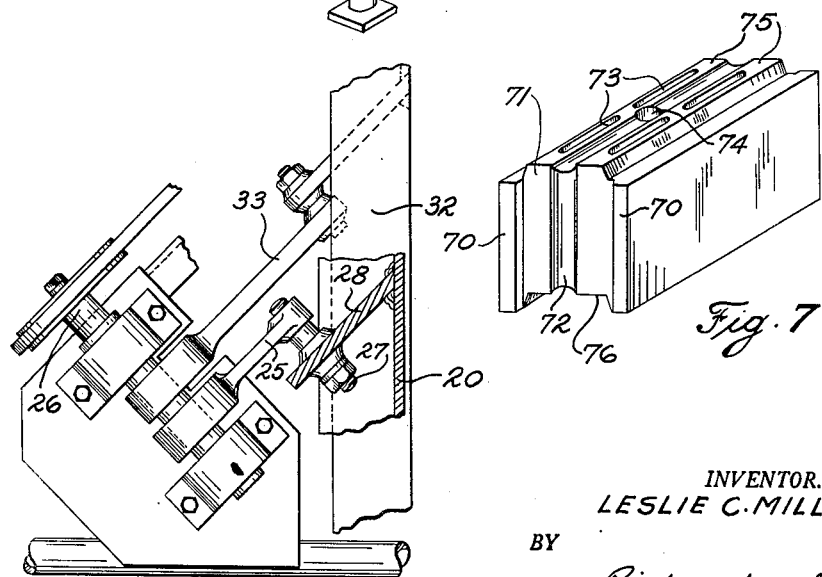
Fig. 3
Fig. 7
INVENTOR.
LESLIE C. MILLER
BY
Richey & Watts
ATTORNEYS

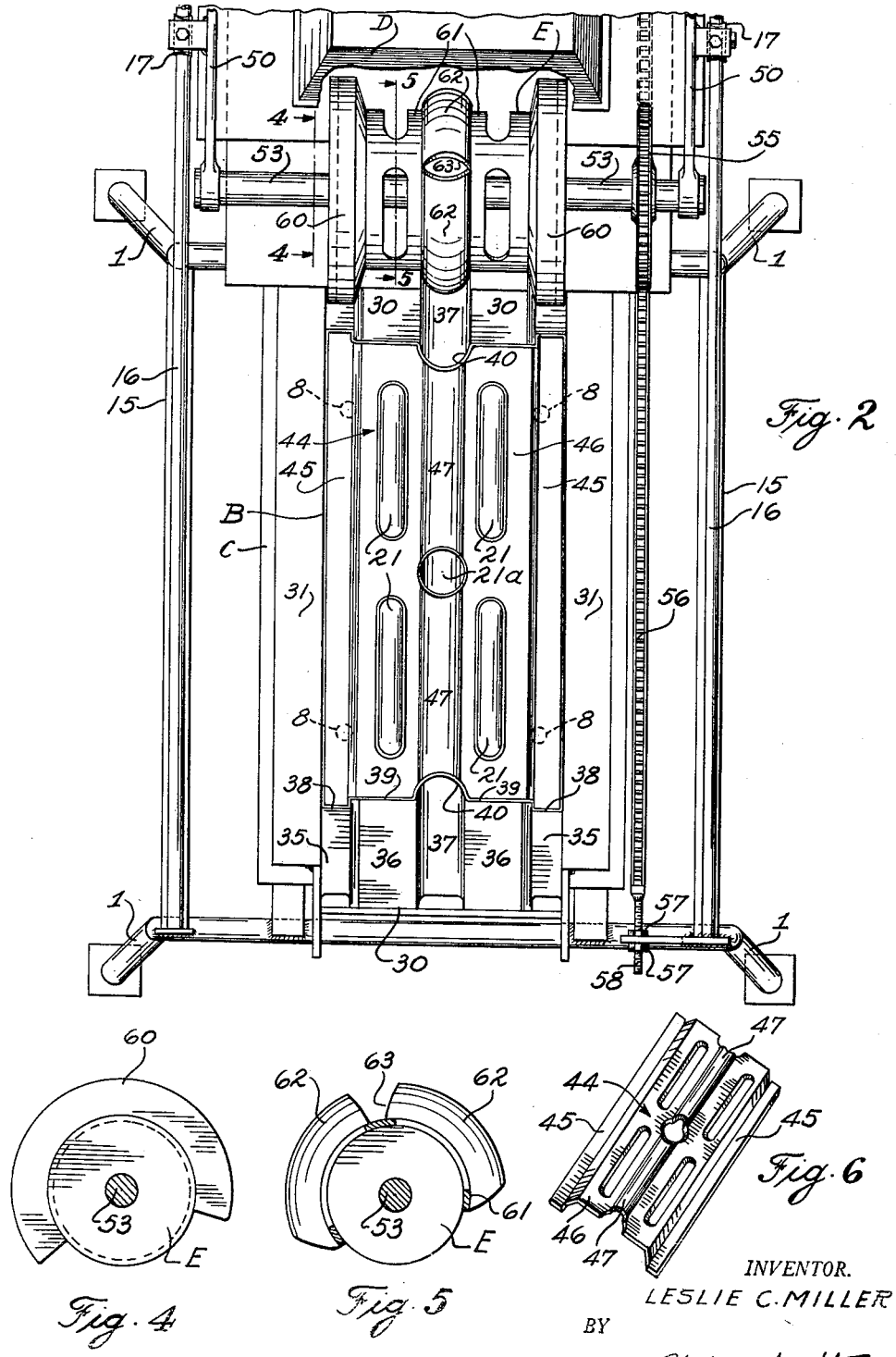

Patented Mar. 13, 1951

2,545,002

UNITED STATES PATENT OFFICE 2,545,002

MACHINE FOR MOLDING CONCRETE BLOCKS

Leslie C. Miller, Macedonia, Ohio

Application November 23, 1949, Serial No. 129,081

6 Claims. (Cl. 25—41)

This invention relates generally to the art of molding aggregate articles and more particularly to new apparatus for molding a new building block.

Machines for molding building blocks of aggregate material as constructed heretofore, so far as I know, have been limited to the making of blocks having smooth planar surfaces. The present invention aims to provide apparatus for producing blocks having plane surfaced side portions and a central portion having surfaces which are not planar and which may be variously shaped.

The present invention will be better understood by those skilled in the art from the drawings which accompany and form a part of this specification and in which, Fig. 1 is a perspective view of one form of apparatus embodying the present invention;

Fig. 2 is a top plan view of the apparatus of Fig. 1 looking down into the mold box;

Fig. 3 is a fragmentary, top plan view of the mold and core reciprocating apparatus;

Figs. 4 and 5 are sectional views partly in elevation taken on lines 4—4 and 5—5, respectively, of Fig. 2;

Fig. 6 is a perspective like view of the pallet of the apparatus of Figs. 1 and 2; and Fig. 7 is a perspective like view of one form of the block which can be made with the apparatus of Figs. 1 to 6 inclusive.

The molding apparatus shown in the drawings comprises a frame A on the top of which is mounted a mold box B, a core C, a feed hopper D and a roll E.

The frame A comprises legs 1 connected together by braces 2 and carrying a platform 3 at the ends of depending rods 4. A foot lever 5 is pivoted on platform 3 and serves, when depressed at the outer end, to initiate upward movement of tube 6 which carries a table 7 at its upper end from which ejector rods 8 project upwardly against the bottom of a pallet in the mold box. The initial upward movement of tube 6 brings the ejector rods 8 into contact with the pallet whereupon endwise manual movement of rod 9 serves to open valve 10 and admit compressed air through pipe 11 into the lower end of pipe or cylinder 6. The air compressor or pump 12 is actuated by motor 13. On top of the frame A brackets 15 are secured in parallel position and each bracket 15 includes top rails 16 along which the hopper D may move. The hopper has two sets of rollers 17 which run on the top of rails 16 and one set of rollers 18 which run on the underside of these rails. The foregoing structure is generally the same as that shown and described in my copending applications Serial No. 756,062, filed June 20, 1947, now Patent No. 2,501,135 and Serial No. 13,447, filed March 6, 1948 now abandoned.

The core C comprises a supporting base 20 from which the cores 21 and 21a project upwardly. This base 20 may be mounted on rubber blocks 22 through which bolts 23 extend and when so mounted the core C may be reciprocated to a limited extent in a horizontal direction. Such reciprocation is accomplished by the apparatus shown in Fig. 3 wherein connecting rod 25 is journalled at one end on an eccentric of shaft 26 and at the other end on pin 27 which is attached by connection 28 to core base 20. When shaft 26 is rotated, connecting rod 25 reciprocates core base 20 in a direction substantially diagonally thereof.

The mold B comprises vertical end walls 30 and side walls 31 which define a rectangular cavity and which are mounted on base 32. This base may rest on rubber blocks 22 through which bolts 23 pass if desired so that the mold may be reciprocated horizontally relative to reciprocation of core base 20. In Fig. 3 the mold base 32 is shown connected by connecting rod 33 to an eccentric on shaft 26. The eccentrics for connecting rods 25 and 33 are preferably opposed to each other so that the core base 20 and mold base 32 will always move in opposite directions.

The end walls 30 of mold box B have inner surfaces which correspond in configuration to the upper surface of the pallet and the outer surface of the roll E, both of which are about to be described. The top surfaces of end walls 30 have horizontal portions 35 adjacent to the side walls 31 but at a level below the top surfaces of sides 31. Between the horizontal portions 35 are mid portions 36 whose top surfaces are above those portions 35 and between the mid portions 36 is located a transversely curved surface 37 defining a depression which preferably is substantially semi-cylindrical. The vertical surfaces of the end walls against which the molded article is to be formed correspond generally in configuration to the top surface of the end walls. These end walls 30 have inner surfaces 38 adjacent to side walls 31, mid portions 39 and a transversely curved central projection 40 which is preferably semi-cylindrical. The surfaces 40 project farther into the mold than surfaces 38 and 39. As a result of the configuration of the vertical surfaces of the end walls 30 of the mold box, the molded article will have side portions corresponding in thickness to the width of surfaces 38 and a central portion between these side portions which have ends recessed in conformity to the surfaces 38 and 39 of end walls 30.

The pallet 44, which is best shown in Fig. 6, preferably consists of metal and may be a light weight metal casting or a steel stamping. This pallet has outwardly extending flanges 45 at its sides, a central portion 46 whose top surface is above the top surface of flanges 45 and the central portion has a transversely curved longitudinally and upwardly extending projection 47 which preferably is substantially semi-cylindrical. The pallet is provided with holes to receive cores 21 and 21a and the holes are enough larger than the cores to permit movement of the pallet and cores relative to each other within the extent of movement permitted by connecting rods 25 and 33. It will be noted that the top surface of the pallet corresponds in configuration to the inner surface of the ends of the mold box and cooperates therewith to connect on the underside of the block the transversely curved recesses formed at the ends of the block by projections 40 of the end walls of the mold box.

The hopper D pivotally carries on opposite sides thereof two arms 50. Adjustable springs 51 tend to move the opposite ends of these levers downwardly. The opposite or free ends of the levers rotatably support a shaft 53 on which is keyed a roll E. A gear 55, also keyed to shaft 53, engages with a rack 56 in the form of a chain which is carried by one of the brackets 15 and which can be adjusted endwise as by nuts 57 on a threaded extension 58 at each end of the rack.

The roll E is for the purpose of pressing down upon and compacting the mixture to be molded in the mold box and for shaping the top surface thereof. It includes opposite arcuate end flanges 60 which are to move along close to the inner surfaces of mold box sides 31. Adjacent to these flanges 60 are portions 61 which have a smaller diameter than portion 60 and which are perforated to receive the upper ends of cores 21. Between the portions 60 is a transversely curved portion 62 which has an opening 63 to receive core 21a and which has a radius which is greater than that of portion 61 and less than that of flange portion 60. It will be observed that the configuration of the outer surface of roll E corresponds generally in configuration to that of the top surfaces of mold box ends 30 and also to the top surface of the pallet. When the roll is moved across the top of mixture to be molded filling the mold box, the flange portions 60 of the roll press down the mixture to be molded along mold box sides 31 to a level below that of the top surfaces of the article formed by the adjacent portion 61 of the roll while the curved projection 62 forms a depression in the top surface of the molded article which connects the upper ends of the depressions formed by projections 40 of the end walls of the mold box.

The molded article formed by the above described apparatus is shown in Fig. 7. There the block has plane side portions 70 and a central portion 71. The central portion has a substantially semi-cylindrical recess or groove 72 extending entirely therearound; it has core openings 73 corresponding to cores 21, a core opening 74 corresponding to core 21a and its top surface 75 and its bottom surface 76 are, respectively, above the top and bottom surfaces of side portion 70.

Having thus described my invention so that others skilled in the art may be able to understand and practice the same, I state that what I desire to secure by Letters Patent is defined in what is claimed.

What is claimed is:

1. A machine for making moist molded articles comprising a vertical mold box, vertical cores projecting upwardly in said box, and a pallet substantially closing the bottom of the box and surrounding the cores for limited lateral movement relative thereto, said pallet having outwardly extending horizontal side flanges, a central portion disposed in a plane above said flanges and a longitudinally extending, transversely curved rib projecting above said central portion, the central portion projecting beyond both ends of said rib and stopping short of both ends of the flanges, the ends of the box having inner vertical faces conforming to and interfitting with the ends of said pallet and means for reciprocating said box and cores relatively and horizontally in opposite diagonal directions.

2. A machine for making moist molded articles comprising a vertical mold box, vertical cores projecting upwardly in said box, and a pallet substantially closing the bottom of the box and surrounding the cores for limited lateral movement relative thereto, said pallet having outwardly extending horizontal side flanges, a central portion disposed in a plane above said flanges and a longitudinally extending transversely curved rig projecting above said central portion, the end walls of said box having inner surfaces corresponding in configuration to and cooperating with the top surface of said pallet, and means for reciprocating said box and cores relatively and horizontally in opposite diagonal directions.

3. A machine for making moist molded articles comprising a vertical mold box, vertical cores projecting upwardly in said box, a pallet substantially closing the bottom of the box and surrounding the cores for limited lateral movement relative thereto and a roll to run on and compact moist material in the mold box, said roll having end flanges to move along the inner side surfaces of the box, portions adjacent to said flanges having a smaller diameter than that of said flanges and perforated to receive the upper ends of the cores and a transversely curved central portion whose radius is less than that of said flanges and greater than that of said portions, the upper surfaces of the end walls of said box corresponding in configuration to and cooperating with the outer surface of said roll, and means for reciprocating said box and cores relatively and horizontally in opposite diagonal directions.

4. A machine for making moist molded articles comprising a vertical mold box, vertical cores projecting upwardly in said box, a pallet substantially closing the bottom of the box and surrounding the cores for limited lateral movement relative thereto and a roll to run on and compact moist material in the mold box, said roll having end flanges to move along the inner side surfaces of the box, portions adjacent to said flanges having a smaller diameter than that of said flanges and perforated to receive the upper ends of the cores and a transversely curved central portion whose radius is less than that of said flanges and greater than that of said portions, said pallet having outwardly extending horizontal side flanges, a central portion disposed in a plane above said flanges and a longitudinally extending transversely curved rib projecting above said central portion, the end walls of said box having inner surfaces corresponding in configuration to and cooperating with the top surface of said pallet, the upper surfaces of said end walls corresponding in configuration to and cooperating with the outer surface of said roll, the central projections of said roll end walls of the box and the pallet serving to form a recess around the molded article, and means for reciprocating said box and cores relatively and horizontally in opposite diagonal directions.

5. A machine for making moist molded articles comprising a vertical mold box, vertical cores projecting upwardly in said box, a pallet substantially closing the bottom of the box and surrounding the cores for limited lateral movement relative thereto, a roll to run on and compact moist material in the mold box, and means for reciprocating said box and cores relatively and horizontally in opposite diagonal directions, said pallet having outwardly extending horizontal side flanges, a central portion disposed in a plane above said flanges and a longitudinally extending rib projecting above said central portion.

6. A machine for making moist molded articles comprising a vertical mold box, vertical cores projecting upwardly in said box, a pallet substantially closing the bottom of the box and surrounding the cores for limited lateral movement relative thereto, a roll to run on and compact moist material in the mold box, and means for reciprocating said box and cores relatively and horizontally in opposite diagonal directions, said roll having end flanges to move along the inner side surfaces of the box, portions adjacent to said flanges having a smaller diameter than that of said flanges and perforated to receive the upper ends of the cores and a central portion whose radius is less than that of said flanges and greater than that of said portions, said pallet having outwardly extending horizontal side flanges, a central portion disposed in a plane above said flanges and a longitudinally extending rib projecting above said central portion, the end walls of said box having inner vertical surfaces corresponding in configuration to and cooperating with the top surface of said pallet, the upper surface of said end walls corresponding to and cooperating with the outer surface of said roll.

LESLIE C. MILLER.

REFERENCES CITED

The following references are of record in the file of this patent:

UNITED STATES PATENTS

| Number | Name | Date |
| --- | --- | --- |
| 792,222 | Jorgensen | June 13, 1905 |
| 1,425,015 | Hyten et al. | Aug. 8, 1922 |
| 1,486,056 | Straub | Mar. 4, 1924 |
| 1,528,582 | Straub | Mar. 3, 1925 |
| 2,282,891 | Schwalbe | May 12, 1942 |
| 2,495,960 | George | Jan. 31, 1950 |